(12) United States Patent
Shirai

(10) Patent No.: US 11,620,258 B2
(45) Date of Patent: Apr. 4, 2023

(54) INFORMATION PROCESSING APPARATUS, INFORMATION PROCESSING SYSTEM, AND NON-TRANSITORY COMPUTER READABLE MEDIUM STORING PROGRAM FOR SWITCHING ACCESS DESTINATION TO FILE

(71) Applicant: FUJIFILM BUSINESS INNOVATION CORP., Tokyo (JP)

(72) Inventor: Yusuke Shirai, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 390 days.

(21) Appl. No.: 16/812,534

(22) Filed: Mar. 9, 2020

(65) Prior Publication Data

US 2021/0064571 A1 Mar. 4, 2021

(30) Foreign Application Priority Data

Aug. 28, 2019 (JP) .............................. JP2019-155884

(51) Int. Cl.
  *G06F 16/11* (2019.01)
  *G06F 16/182* (2019.01)
  *G06F 16/176* (2019.01)
(52) U.S. Cl.
  CPC .......... *G06F 16/119* (2019.01); *G06F 16/122* (2019.01); *G06F 16/176* (2019.01); *G06F 16/184* (2019.01)
(58) Field of Classification Search
  CPC .... G06F 16/119; G06F 16/122; G06F 16/176; G06F 16/184; G06F 16/1815; H04L 67/1097
  See application file for complete search history.

(56) References Cited

U.S. PATENT DOCUMENTS 6,230,239 B1 * 5/2001 Sakaki .................... G06F 3/067
                                                                711/112
6,374,327 B2    4/2002 Sakaki et al.
(Continued)

FOREIGN PATENT DOCUMENTS

JP      H10-171605 A    6/1998
JP      2003-173279 A   6/2003

OTHER PUBLICATIONS

Hurley, Richard T., and Soon Aun Yeap. "File migration and file replication: a symbiotic relationship." IEEE Transactions on Parallel and Distributed Systems 7.6 (1996): 578-586. (Year: 1996).*

*Primary Examiner* — Ramon A. Mercado
(74) *Attorney, Agent, or Firm* — Oliff PLC

(57) ABSTRACT

An information processing apparatus includes an acquiring part, a copying part, and a switching part. The acquiring part acquires a file structure at a migration source and one or more identification information items each of which identifies a file at the migration source. The copying part copies the file structure and the one or more identification information items to a migration destination before migration of content data of one or more files at the migration source. In response to detection of an operation on a file corresponding to one of the one or more identification information items copied to the migration destination by the copying part, the switching part switches an access destination to the file at the migration source if a migration time to complete migration of content data of the file and finish the operation is equal to a predetermined duration or more.

17 Claims, 8 Drawing Sheets

(56) References Cited

U.S. PATENT DOCUMENTS

| | | | | |
|---|---|---|---|---|
| 7,346,664 B2* | 3/2008 | Wong | ................... | H04L 9/40 |
| | | | | 709/215 |
| 7,386,552 B2 | 6/2008 | Kitamura et al. | | |
| 7,720,796 B2* | 5/2010 | Wong | ................... | G06F 11/2094 |
| | | | | 707/639 |
| 8,515,919 B1* | 8/2013 | Patwardhan | ......... | G06F 16/119 |
| | | | | 707/687 |
| 9,811,527 B1* | 11/2017 | Esposito | ............ | G06F 16/214 |
| 10,389,584 B1* | 8/2019 | Ezra | ................... | H04L 41/0668 |
| 10,613,780 B1* | 4/2020 | Naeni | ................ | G06F 11/2097 |
| 2003/0110237 A1* | 6/2003 | Kitamura | ............ | G06F 16/10 |
| | | | | 709/219 |
| 2006/0271598 A1* | 11/2006 | Wong | ................... | G06F 16/119 |
| 2008/0263614 A1* | 10/2008 | Xu | .................. | H04H 60/07 |
| | | | | 725/118 |
| 2009/0150449 A1* | 6/2009 | McClanahan | ....... | G06F 16/1744 |
| 2009/0150533 A1* | 6/2009 | McClanahan | ....... | G06F 16/182 |
| | | | | 709/223 |
| 2009/0271455 A1* | 10/2009 | Nagarajan | .......... | G06F 16/9535 |
| | | | | 707/999.102 |
| 2010/0023543 A1* | 1/2010 | Kufluk | .............. | H04L 67/565 |
| | | | | 707/E17.116 |
| 2010/0274825 A1* | 10/2010 | Nemoto | ................ | G06F 16/119 |
| | | | | 707/812 |
| 2010/0325378 A1* | 12/2010 | Maruyama | ........... | G06F 3/0607 |
| | | | | 711/E12.001 |
| 2011/0075516 A1* | 3/2011 | Xia | ..................... | G01V 1/303 |
| | | | | 367/53 |
| 2011/0197039 A1* | 8/2011 | Green | ................. | G06F 3/0659 |
| | | | | 718/1 |
| 2012/0005452 A1* | 1/2012 | Aral | ................... | G06F 12/0866 |
| | | | | 711/E12.078 |
| 2013/0073820 A1* | 3/2013 | Watanabe | ............ | G06F 3/0659 |
| | | | | 711/E12.103 |
| 2013/0339298 A1* | 12/2013 | Muller | .................. | G06F 16/16 |
| | | | | 707/640 |
| 2016/0142261 A1* | 5/2016 | Huang | ................. | G06F 9/5072 |
| | | | | 709/223 |
| 2017/0272962 A1* | 9/2017 | Lu | ....................... | H04W 8/082 |
| 2018/0069751 A1* | 3/2018 | Guo | ..................... | H04L 41/0803 |
| 2018/0241838 A1* | 8/2018 | Druzhinin | ........... | H04L 67/1097 |
| 2020/0034475 A1* | 1/2020 | Venkatesan | ......... | G06F 3/0647 |
| 2021/0064571 A1* | 3/2021 | Shirai | .................. | G06F 16/176 |
| 2021/0271648 A1* | 9/2021 | Arbel | ................... | G06F 16/21 |

\* cited by examiner

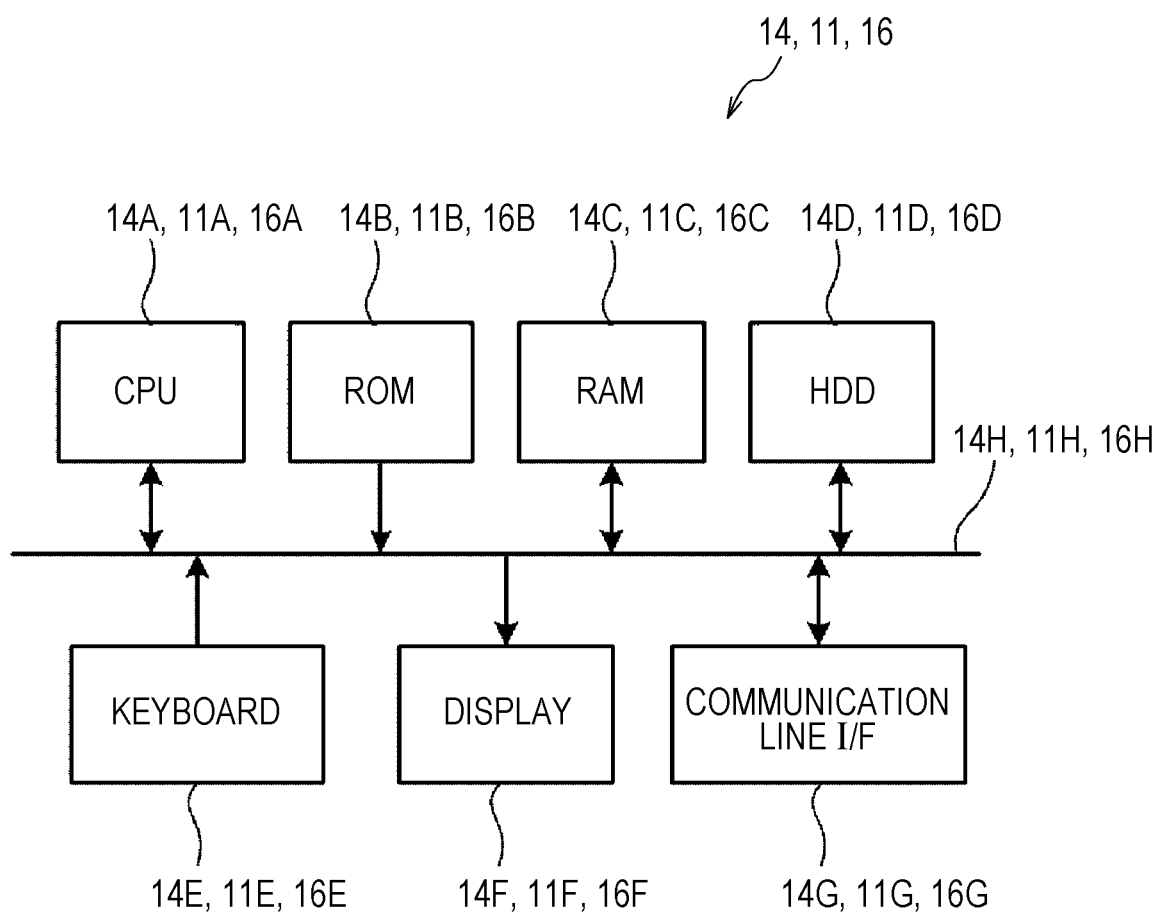

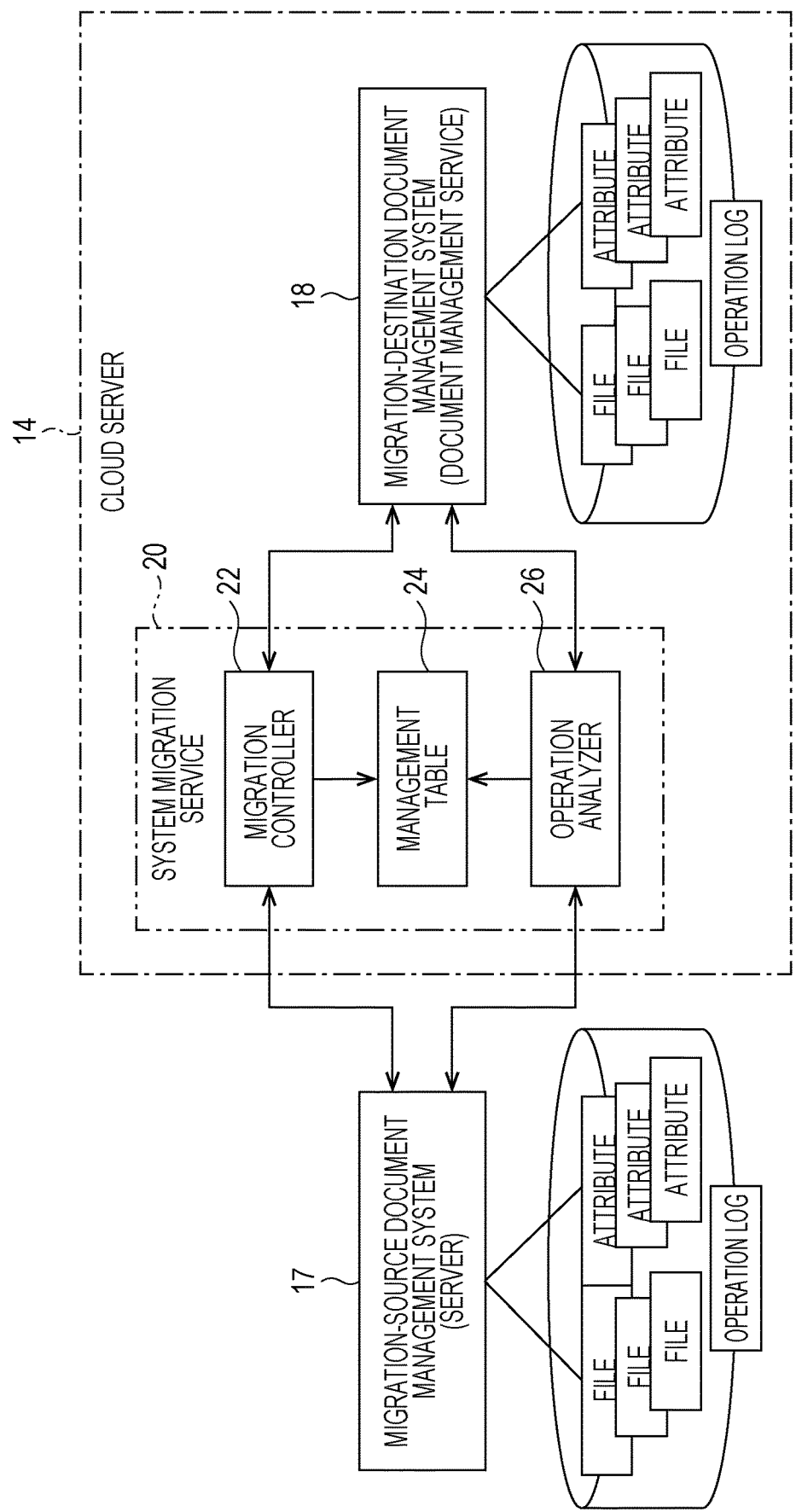

FIG. 4

| MIGRATION COMPLETION RATE (%) | NUMBER OF PIECES OF MIGRATED DATA | TOTAL NUMBER OF PIECES OF DATA TO BE MIGRATED |
|---|---|---|
| 33 | 9,981,222 | 30,000,000 |

| ITEM | VALUE |
|---|---|
| Use Existing System If Migration Is Time-Consuming | ▼ |
| Use Existing System for Operation without Migrating Data in Following Cases | ○ Processing Time in Existing System Is Shorter (Not Recommendable Because Migration Is Retarded)<br>◉ Processing Time in New System Is Equal to 120% of Processing Time in Existing System<br>○ Processing Time in New System Is Equal to 150% of Processing Time in Existing System<br>○ Processing Time in New System Is Equal to 200% of Processing Time in Existing System |

SET

FIG. 7

| ID | OPERATION TARGET | OPERATION | AMOUNT OF DATA | ELAPSED TIME |
|---|---|---|---|---|
| 1 | FOLDER 1 | DOWNLOAD | 10 M | 1 SECOND |
| 2 | FILE 1 | DOWNLOAD | 1 M | 0.5 SECONDS |
| ⋮ | ⋮ | ⋮ | ⋮ | ⋮ |

FIG. 8

| ID | OPERATION TARGET | OPERATION | AMOUNT OF DATA | ELAPSED TIME |
|---|---|---|---|---|
| 1 | FOLDER 2 | CHANGE ACCESS RIGHT | N/A | 1 SECOND |
| 2 | FOLDER 1 | DOWNLOAD | 10 M | 0.5 SECONDS |
| ⋮ | ⋮ | ⋮ | ⋮ | ⋮ |

FIG. 9

| ID | OPERATION TARGET | AMOUNT OF DATA | ELAPSED TIME | STARTING DATE AND TIME |
|---|---|---|---|---|
| 1 | FILE 1 | 10 M | 1 SECOND | 3/25/2019 8:30 |
| 2 | FILE 2 | 2 M | 0.2 SECONDS | 3/25/2019 23:30 |
| ⋮ | ⋮ | ⋮ | ⋮ | ⋮ |

INFORMATION PROCESSING APPARATUS, INFORMATION PROCESSING SYSTEM, AND NON-TRANSITORY COMPUTER READABLE MEDIUM STORING PROGRAM FOR SWITCHING ACCESS DESTINATION TO FILE

CROSS-REFERENCE TO RELATED APPLICATIONS

This application is based on and claims priority under 35 USC 119 from Japanese Patent Application No. 2019-155884 filed Aug. 28, 2019.

BACKGROUND

(i) Technical Field

The present disclosure relates to an information processing apparatus, an information processing system, and a non-transitory computer readable medium storing a program.

(ii) Related Art

Japanese Unexamined Patent Application Publication No. 2003-173279 proposes a file migration method in which file attributes unique to the Network File System (NFS) and file attributes unique to the Common Internet File System (CIFS) are copied and both of the file attributes are stored in a new file server apparatus so that date and time information, such as file access time, is maintained. When a file access to a piece of data that has not been migrated to a new file server is made from a host computer during a file migration process in this file migration method, the new file server reads the piece of data from the existing file server to process the file access and operates as if the new file server were the existing file server.

Japanese Unexamined Patent Application Publication No. 10-171605 proposes a method of performing data migration between disk subsystems while a central processing unit (CPU) access is processed. In this method, when an access for writing data is requested by the central processing apparatus, the data is always written to the migration source volume to ensure consistency of all the data in the migration source volume.

SUMMARY

A technique in the related art has provided an operation in which data to be migrated is read from a migration source by a system in response to a file access received during a file migration process and the system operates as if the system were the migration source. Depending on a process load, however, the processing can sometimes be completed in a shorter time if content data is migrated to the migration destination before the file access is processed. Aspects of non-limiting embodiments of the present disclosure relate to providing an information processing apparatus, an information processing system, and a non-transitory computer readable medium storing an information processing program that distribute processing operations during system migration and can reduce a process load compared with the case where data is read from a migration source during the system migration.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including an acquiring part, a copying part, and a switching part. The acquiring part acquires a file structure at a migration source and one or more identification information items each of which identifies a file at the migration source. The copying part copies the file structure and the one or more identification information items to a migration destination before migration of content data of one or more files at the migration source. In response to detection of an operation on a file corresponding to one of the one or more identification information items copied to the migration destination by the copying part, the switching part switches an access destination to the file at the migration source if a migration time to complete migration of content data of the file and finish the operation is equal to a predetermined duration or more.

BRIEF DESCRIPTION OF THE DRAWINGS

An exemplary embodiment of the present disclosure will be described in detail based on the following figures, wherein:

FIG. 2 is a block diagram depicting a configuration of major electrical components of each of an information processing terminal, a cloud server, and a server in the information processing system according to the present exemplary embodiment;

FIG. 3 is a block diagram depicting a functional configuration of the cloud server in the information processing system according to the present exemplary embodiment;

FIG. 4 is an illustration depicting an example of a migration-progress management screen and a processing-assignment-function-during-migration setting screen while migration control is performed;

FIG. 7 is an illustration depicting an example operation log of the migration-source document management system;

FIG. 8 is an illustration depicting an example operation log of the migration-destination document management system;

FIG. 9 is an illustration depicting an example migration-process result table;

DETAILED DESCRIPTION

Figure 1:
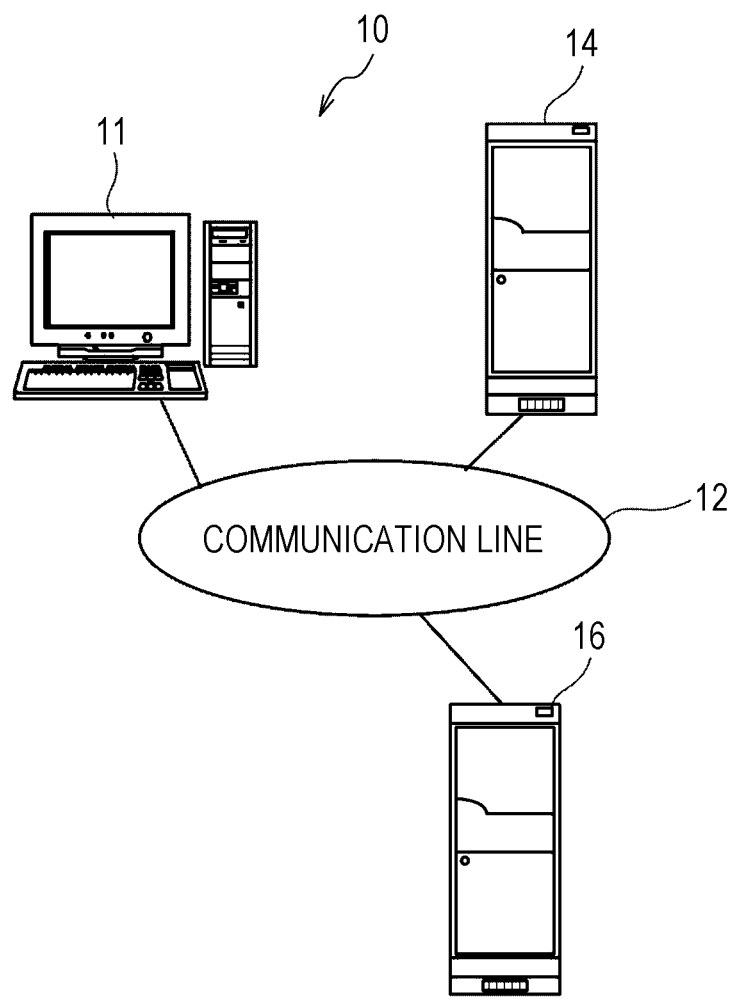
FIG. 1 is an illustration depicting a schematic configuration of an information processing system according to the present exemplary embodiment.

Hereinafter, an example in the present exemplary embodiment will be described in detail with reference to the drawings. In the present exemplary embodiment, an information processing system in which an information processing terminal and a plurality of servers are connected to each other via a communication line, such as various kinds of networks, will be described as an example. FIG. 1 is an illustration depicting a schematic configuration of an information processing system 10 according to the present exemplary embodiment.

The information processing system 10 according to the present exemplary embodiment includes an information processing terminal 11, a cloud server 14, which serves as an information processing apparatus, and a server 16, which serves as a migration-source manager, as depicted in FIG. 1. In the present exemplary embodiment, an example of the information processing system 10 that includes a single information processing terminal 11, a single cloud server 14, and a single server 16 is described, but the information processing system 10 may include one or more information processing terminals 11, one or more cloud servers 14, and one or more servers 16.

The information processing terminal 11, the cloud server 14, and the server 16 are connected to each other via a communication line 12, such as a local area network (LAN), a wide area network (WAN), the Internet, or an intranet. The information processing terminal 11, the cloud server 14, and the server 16 are capable of transmitting and receiving various kinds of data to and from each other via the communication line 12.

In the information processing system 10 according to the present exemplary embodiment, the cloud server 14 provides a system migration service and a document management service as a cloud service. The system migration service performs, for example, a process in which a system such as a document management system that is set up in the server 16 located on premises is migrated to a document management system provided by the cloud server 14 or to a different system such as the information processing terminal 11. In the present exemplary embodiment, system migration is described under the assumption that a system at a migration source is copied to a migration destination, but a system at a migration source may be migrated to a migration destination without retaining the system at the migration source.

Next, a configuration of major electrical components of each of the information processing terminal 11, the cloud server 14, and the server 16 according to the present exemplary embodiment will be described. FIG. 2 is a block diagram depicting a configuration of major electrical components of each of the information processing terminal 11, the cloud server 14, and the server 16 in the information processing system 10 according to the present exemplary embodiment. The information processing terminal 11, the cloud server 14, and the server 16 each are basically designed to have a configuration of a general-purpose computer, and thus the cloud server 14 will be described as a representative example.

The cloud server 14 according to the present exemplary embodiment includes a central processing unit (CPU) 14A, a read-only memory (ROM) 14B, a random-access memory (RAM) 14C, a hard disk drive (HDD) 14D, a keyboard 14E, a display 14F, and a communication line interface (I/F) 14G, as depicted in FIG. 2. The CPU 14A manages the entire operation of the cloud server 14. The ROM 14B stores various control programs, various parameters, and the like in advance. The RAM 14C is used as a work area and the like while the CPU 14A executes various programs. The HDD 14D stores various kinds of data, application programs, and the like. The keyboard 14E is used for inputting various kinds of information. The display 14F is used for displaying various kinds of information. The communication line I/F 14G is connected to the communication line 12 and transmits and receives various kinds of data to and from other apparatuses connected to the communication line 12. All the above units in the cloud server 14 are electrically connected to each other via a system bus 14H. In the cloud server 14 according to the present exemplary embodiment, although the HDD 14D is adopted as a storage unit, this is not meant to be limiting, and a different nonvolatile storage unit, such as a flash memory, may be adopted.

In the above configuration of the cloud server 14 according to the present exemplary embodiment, the CPU 14A performs access to the ROM 14B, the RAM 14C, and the HDD 14D, acquisition of various kinds of data via the keyboard 14E, and display of various kinds of information on the display 14F. The cloud server 14 also controls transmission and reception of communication data via the communication line I/F 14G by using the CPU 14A.

In the information processing system 10 according to the present exemplary embodiment, the information processing system 10 being configured in this way, the cloud server 14 provides the system migration service and the document management service as a cloud service, as described above. A description will be given below, as an example, of a case where the system migration service migrates a migration-source document management system 17 that is set up in the server 16 to a document management service provided by the cloud server 14 (hereinafter referred to as a migration-destination document management system 18).

When files in a document management system are migrated, a known technique creates a complete copy and a differential copy of the entire system to migrate the system. However, while the complete copy of the entire system is being created, the system needs to be shut down. Further, the system shutdown period is sometimes prolonged in proportion to the amount of data. Thus, in the present exemplary embodiment, the file structure at a migration source and the identification information items each of which identifies a file at the migration source are copied to a migration destination before content data of one or more files at the migration source is migrated. In this way, once the file structure and the identification information items are copied to the migration destination, the system at the migration destination is able to operate, and the system shutdown period is shortened compared with a case where the complete copy of the entire system is created.

In addition, in the present exemplary embodiment, in response to detection of an operation on a file corresponding to one of the identification information items copied to the migration destination, the access destination is switched to the file at the migration source if a migration time to complete the migration of the content data of the file and finish the operation is equal to a predetermined duration or more. This procedure reduces the time to complete the operation compared with the time required by a technique where a system reads data to be migrated from a migration source and operates as if the system were the migration source. This is because a procedure is employed to switch the access destination to the migration-source document management system 17 when the processing to migrate objects to the migration-destination document management system 18 and perform the operation on the objects is time-consuming in such a case that the number of objects to be migrated is large.

FIG. 3 is a block diagram depicting a functional configuration of the cloud server 14 in the information processing system 10 according to the present exemplary embodiment.

As described above, the information processing system 10 according to the present exemplary embodiment provides a system migration service 20 and the migration-destination document management system 18 as a cloud service.

The system migration service 20 migrates to the migration-destination document management system 18, which serves as a migration-destination manager, a plurality of files and attributes of the plurality of files, both of which are managed by the migration-source document management system 17, together with the file structure including a hierarchical structure of the files.

The system migration service 20 includes functions of a management table 24, an operation analyzer 26, and a migration controller 22, as depicted in FIG. 3. The migration controller 22 corresponds to an acquiring part, a copying part, a switching part, a migration part, and a change part.

The management table 24 manages the sequence and the state in which files are migrated from the migration-source document management system 17 to the migration-destination document management system 18.

The operation analyzer 26 analyzes operations in the migration-source document management system 17 and operations in the migration-destination document management system 18 to determine a migration sequence. Specifically, the operation analyzer 26 analyzes operations such as the frequencies and the numbers of accesses to files by using information regarding the migration-source document management system 17, determines a migration sequence, and sets the migration sequence in the management table 24. The operation analyzer 26 also assesses operations in the migration-destination document management system 18.

The migration controller 22 controls migration of files to be migrated from the migration-source document management system 17 to the migration-destination document management system 18. In the present exemplary embodiment, the file structure at the migration source, which includes a hierarchy of files and a tree structure, and the identification information items each of which identifies a file are acquired from the migration-source document management system 17, and the file structure and the identification information items are copied to the migration-destination document management system 18 before content data of the files is migrated. The migration controller 22 also migrates the system by sequentially copying content data of the files in the migration-source document management system 17 to corresponding locations of the file structure and the identification information items, which have been copied. Attribute information of the files may also be acquired simultaneously and copied to the migration-destination document management system 18 when the file structure and the identification information items are copied to the migration-destination document management system 18. Examples of the attribute information include a registration date, an access date, a drawing number, a file type, and a document type.

In addition, if a user operation is performed in the migration-destination document management system 18 after the file structure and the identification information items have been copied to the migration-destination document management system 18, the migration controller 22 determines whether to cause the migration-source document management system 17 or to cause the migration-destination document management system 18 to process the user operation. The migration controller 22 determines whether to cause the migration-source document management system 17 or to cause the migration-destination document management system 18 to process the user operation, for example, depending on the number of pieces of data, the data sizes, and the like of one or more files selected with the user operation as an operation target. Then, depending on the determination result, the migration controller 22 performs control to assign the user request to the migration-source document management system 17 or to the migration-destination document management system 18.

If the migration-destination document management system 18 is selected for the processing of the user operation, the migration controller 22 changes the migration sequence that is set in the management table 24 and prioritizes in migration the content data of one or more files that are selected with the user operation as operation targets.

An example screen regarding migration control by the migration controller 22 will be described. FIG. 4 is an illustration depicting an example of a migration-progress management screen and a processing-assignment-function-during-migration setting screen while migration control is performed.

While data is being migrated, the migration controller 22 has a function of managing migration progress and managing and displaying the status regarding the migration progress during migration. For example, as depicted in FIG. 4, the migration completion rate (%), the number of pieces of migrated data, and the total number of pieces of data to be migrated are displayed as an example of the status regarding the migration progress during migration.

The migration controller 22 also has a function of configuring settings. If the file structure and the identification information items that have been copied to the migration-destination document management system 18 undergo an operation before the content data of a file is migrated, it is determined based on the settings whether to migrate the content data of the file and perform the processing at the migration destination or to perform the processing at the migration source. For example, a processing-assignment-function-during-migration setting screen depicted in FIG. 4 is displayed, and the settings are configured based on the displayed setting screen.

In the processing-assignment-function-during-migration setting screen depicted in FIG. 4, if the item "Use Existing System If Migration Is Time-Consuming" is selected, the processing is assigned to the migration-source document management system 17 rather than performed after the migration. In addition, in the example depicted in FIG. 4, the item "Use Existing System for Operation without Migrating Data in Following Cases" has four options from which one option is to be selected, and the processing is assigned based on the selected option. The migration speed decreases as the number of tasks assigned to the migration-source document management system 17, which is the existing system, increases, and thus four options corresponding to a plurality of thresholds for the processing time are available. In the example depicted in FIG. 4, if the item "Processing Time in Existing System Is Shorter (Not Recommendable Because Migration Is Retarded)" is selected, the processing is assigned to the migration-source document management system 17 in a case where the processing time at the migration source is shorter than the processing time at the migration destination. If the item "Processing Time in New System Is Equal to 120% of Processing Time in Existing System" is selected, the processing is assigned to the migration-source document management system 17 in a case where 120% of the processing time at the migration source is shorter than the processing time at the migration destination. If the item "Processing Time in New System Is Equal to 150% of Processing Time in Existing System" is selected, the processing is assigned to the migration-source document management system 17 in a case where 150% of the processing time at the migration source is shorter than the processing time at the migration destination. If the item "Processing Time in New System Is Equal to 200% of Processing Time in Existing System" is selected, the processing is assigned to the migration-source document management system 17 in a case where 200% of the processing time at the migration source is shorter than the processing time at the migration destination.

The migration-progress management screen and the processing-assignment-function-during-migration setting screen are displayed on a single screen in FIG. 4 but may be displayed on separate screens.

Figure 5:
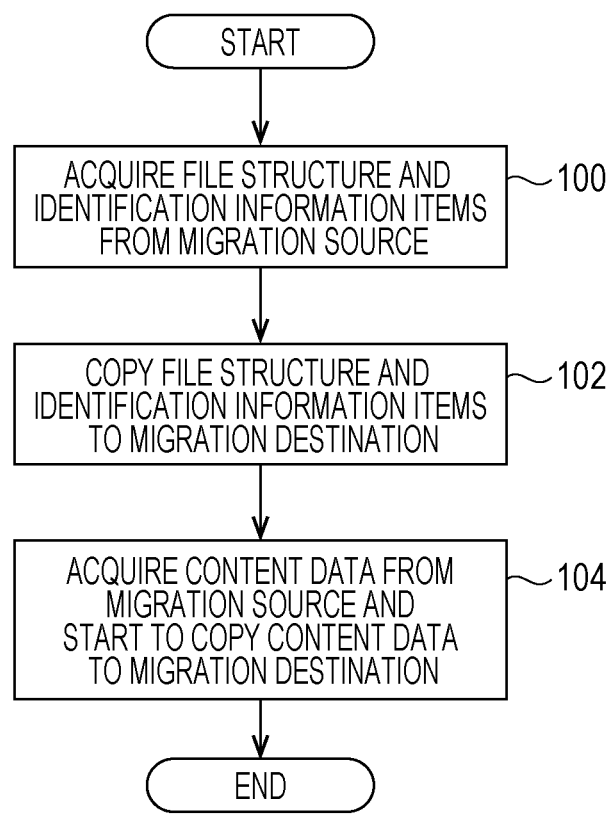
FIG. 5 is a flowchart depicting an example flow of a process performed by a system migration service of the cloud server in the information processing system according to the present exemplary embodiment.

Next, a description will be given of a process performed by the cloud server 14 in the information processing system 10 according to the present exemplary embodiment, the information processing system 10 being configured as described above. FIG. 5 is a flowchart depicting an example flow of the process performed by the system migration service 20 of the cloud server 14 in the information processing system 10 according to the present exemplary embodiment. The process depicted in FIG. 5 starts when instructions to perform migration from the migration-source document management system 17 to the migration-destination document management system 18 are provided.

In step 100, the migration controller 22 acquires from the migration-source document management system 17 the file structure and the identification information items each of which identifies a file, and the process proceeds to step 102. Step 100 corresponds to an operation performed by the acquiring part.

In step 102, the migration controller 22 copies to the migration-destination document management system 18 the file structure and the identification information items, which have been acquired, and the process proceeds to step 104. Once the file structure and the identification information items are copied to the migration-destination document management system 18, the file structure and the identification information items are viewable, and thus the migration-destination document management system 18 is able to operate. Step 102 corresponds to an operation performed by the copying part.

In step 104, the migration controller 22 acquires content data of files from the migration-source document management system 17 and sequentially starts to copy the content data to the migration-destination document management system 18, and a series of procedures is finished. Step 104 corresponds to an operation performed by the migration part.

Figure 6:
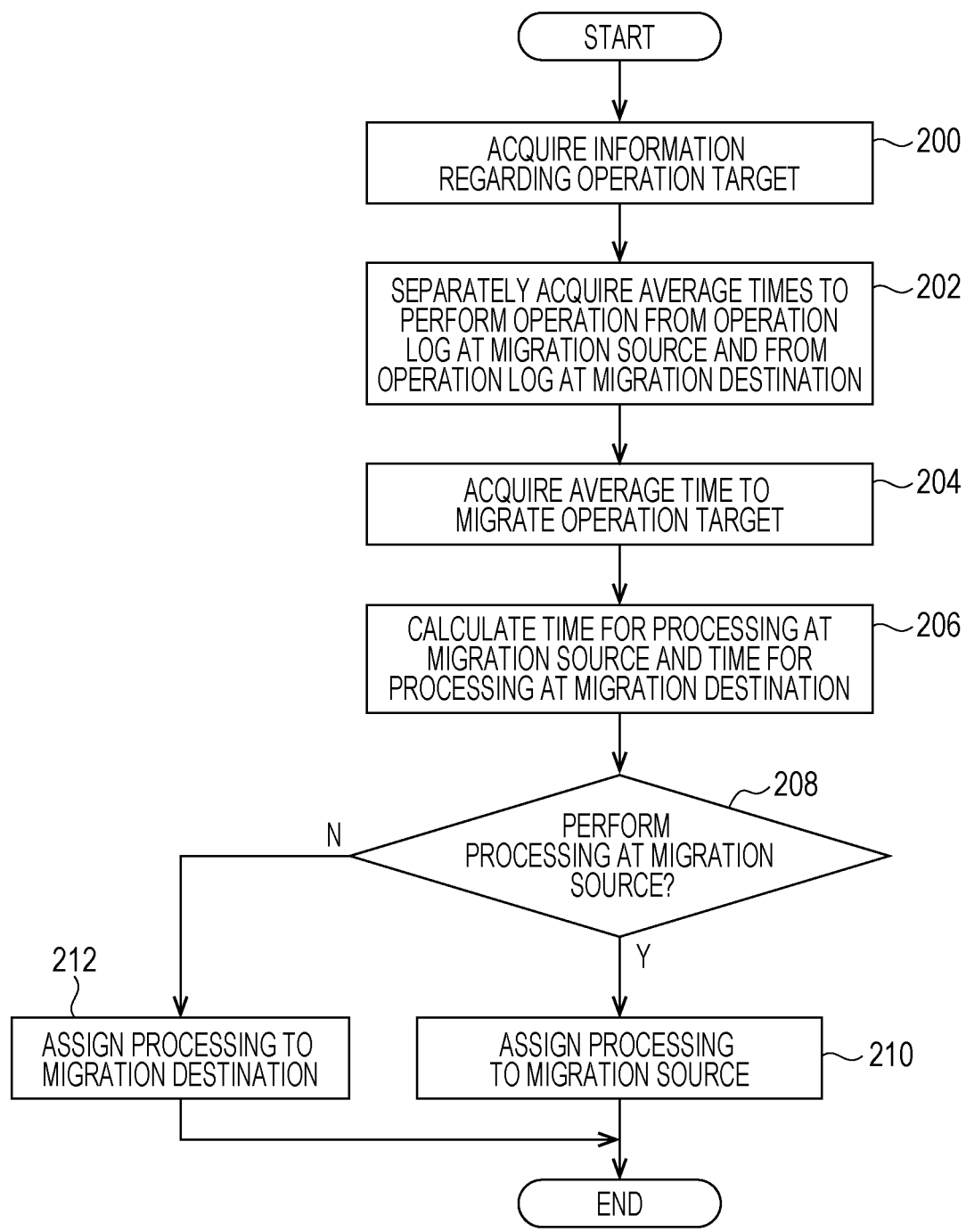
FIG. 6 is a flowchart depicting an example flow of a process performed by the system migration service in response to a user operation in a migration-destination document management system during migration of content data of files from a migration-source document management system to the migration-destination document management system.

Next, a description will be given of a process performed by the system migration service 20 in response to a user operation in the migration-destination document management system 18 during migration of content data of files from the migration-source document management system 17 to the migration-destination document management system 18. FIG. 6 is a flowchart depicting an example flow of the process performed by the system migration service 20 in response to a user operation in the migration-destination document management system 18 during migration of content data of files from the migration-source document management system 17 to the migration-destination document management system 18. The process depicted in FIG. 6 starts when the operation analyzer 26 detects an operation in the migration-destination document management system 18.

In step 200, the operation analyzer 26 acquires information regarding an operation target, and the process proceeds to step 202. Namely, operation information received by the migration-destination document management system 18 is acquired.

In step 202, the operation analyzer 26 acquires the average time to perform the operation on the operation target. The average times are separately acquired from the operation log of the migration-source document management system 17 and from the operation log of the migration-destination document management system 18, and the process proceeds to step 204. Examples of the operation logs of the migration-source document management system 17 and the migration-destination document management system 18 include an operation log depicted in FIG. 7. The operation analyzer 26 acquires such an operation log as is depicted in FIG. 7 from the migration-source document management system 17 and stores the operation log in the management table 24. The average time to perform an operation, such as download, is derived from such operation logs as are depicted in FIGS. 7 and 8. FIG. 7 is an illustration depicting an example operation log of the migration-source document management system 17, and FIG. 8 is an illustration depicting an example operation log of the migration-destination document management system 18.

In step 204, the migration controller 22 acquires the average time to migrate the operation target, and the process proceeds to step 206. For example, the migration controller 22 registers such a migration-process result table as is depicted in FIG. 9 in the management table 24 as results of migration processes, and the average time to migrate the operation target is acquired from the migration-process result table that is registered. Migration is expected to take a long time during daytime, when communication lines are busy, because the bandwidth of the communication lines allocated for migration is limited, and thus, for example, the average time during business hours and the average time outside business hours may be derived separately.

In step 206, the migration controller 22 calculates the time for the migration-source document management system 17 to perform the processing and the time for the migration-destination document management system 18 to perform the processing, and the process proceeds to step 208. Specifically, the migration controller 22 uses the results obtained in steps 202 and 204 and calculates the estimated time for the migration-source document management system 17 to perform the operation on the file corresponding to the operation target and the estimated time for the migration-destination document management system 18 to perform the operation on the file corresponding to the operation target.

In step 208, the migration controller 22 determines whether the migration-source document management system 17 is to perform the processing. The determination is made, for example, based on the settings in the processing-assignment-function-during-migration setting screen depicted in FIG. 4. If an affirmative determination is made in step 208, the process proceeds to step 210. If a negative determination is made in step 208, the process proceeds to step 212.

In step 210, the migration controller 22 assigns the processing to the migration-source document management system 17, and a series of procedures is finished. For example, if a user performs an operation of downloading a folder, the migration controller 22 creates archive data of a folder tree in the migration-source document management system 17 and provides the user with the archive data. Step 210 corresponds to an operation performed by the switching part.

In contrast, in step 212, the migration controller 22 assigns the processing to the migration-destination document management system 18, and a series of procedures is finished. For example, if a user performs an operation of downloading a folder, the migration controller 22 migrates the target folder to the migration-destination document management system 18, and the migration-destination document management system 18 creates archive data of a folder tree and provides the user with the archive data.

Descriptions will be given of cases where, for example, a user performs an operation of downloading a folder in the migration-destination document management system 18 after the file structure and the identification information items have been copied and before the migration of the content data of files is complete.

Figure 10:
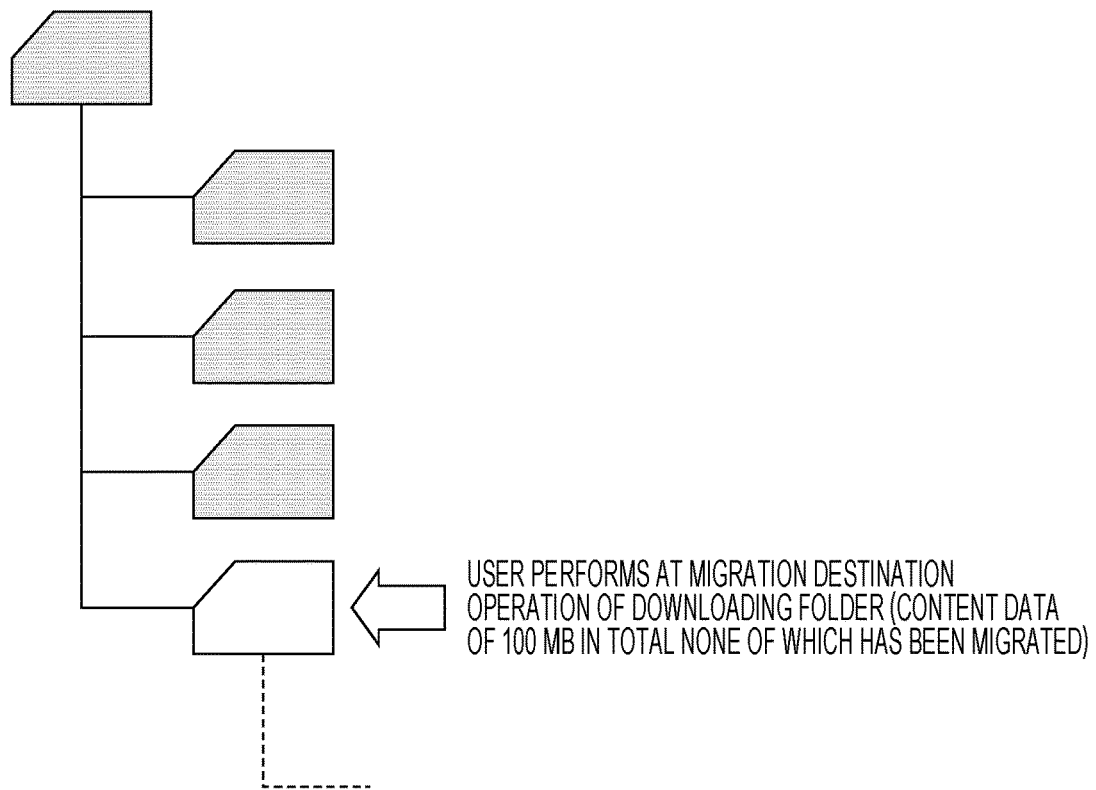
FIG. 10 is an illustration depicting an example in which a user performs in the migration-destination document management system an operation of downloading a folder that contains content data of 100 megabytes (MB) in total none of which has been migrated.

As a first example, which is depicted in FIG. 10, a description will be given of a case where a user performs in the migration-destination document management system 18 an operation of downloading a folder that contains content data of 100 megabytes (MB) in total none of which has been migrated. It is assumed that the download operation is performed during business hours and that the average speed of data migration during business hours, which is derived from the migration-process result table, is equal to 0.5 s/MB and the average speed of download operation, which is derived from the operation log of the migration-destination document management system 18, is equal to 0.1 s/MB.

In this case where the data is migrated and then the migration-destination document management system 18 is caused to perform the download operation, the estimated time T1 is calculated as (0.5 s/MB+0.1 s/MB)×100 MB=60 s.

In contrast, if the average speed of download operation derived from the operation log of the migration-source document management system 17 is assumed to be 0.2 s/MB, the estimated time T2 for the migration-source document management system 17 to perform the download operation is calculated as 0.2 s/MB×100 MB=20 s.

If the setting in the processing-assignment-function-during-migration setting screen is such that the item "Processing Time in New System Is Equal to 120% of Processing Time in Existing System" is selected as depicted in FIG. 4, 120% of the estimated time for the migration-source document management system 17 to perform the download operation is calculated as 20 s×1.2=24 s. Consequently, in this example, since the estimated time T1>the estimated time T2×1.2, the migration controller 22 assigns the processing to the migration-source document management system 17.

Next, a description will be given of a case where it is assumed that the download operation in the first example is performed outside business hours and that the average speed of data migration outside business hours, which is derived from the migration-process result table, is 0.1 s/MB.

In this case where the data is migrated and then the migration-destination document management system 18 is caused to perform the download operation, the estimated time T3 is calculated as (0.1 s/MB+0.1 s/MB)×100 MB=20 s.

In contrast, the estimated time T2 for the migration-source document management system 17 to perform the download operation is calculated to be T2=20 s as described above.

If the setting in the processing-assignment-function-during-migration setting screen is such that the item "Processing Time in New System Is Equal to 120% of Processing Time in Existing System" is selected as depicted in FIG. 4, 120% of the estimated time for the migration-source document management system 17 to perform the download operation is calculated as 20 s×1.2=24 s. Consequently, in this example, since the estimated time T3<the estimated time T2×1.2, the migration controller 22 assigns the processing to the migration-destination document management system 18.

Figure 11:
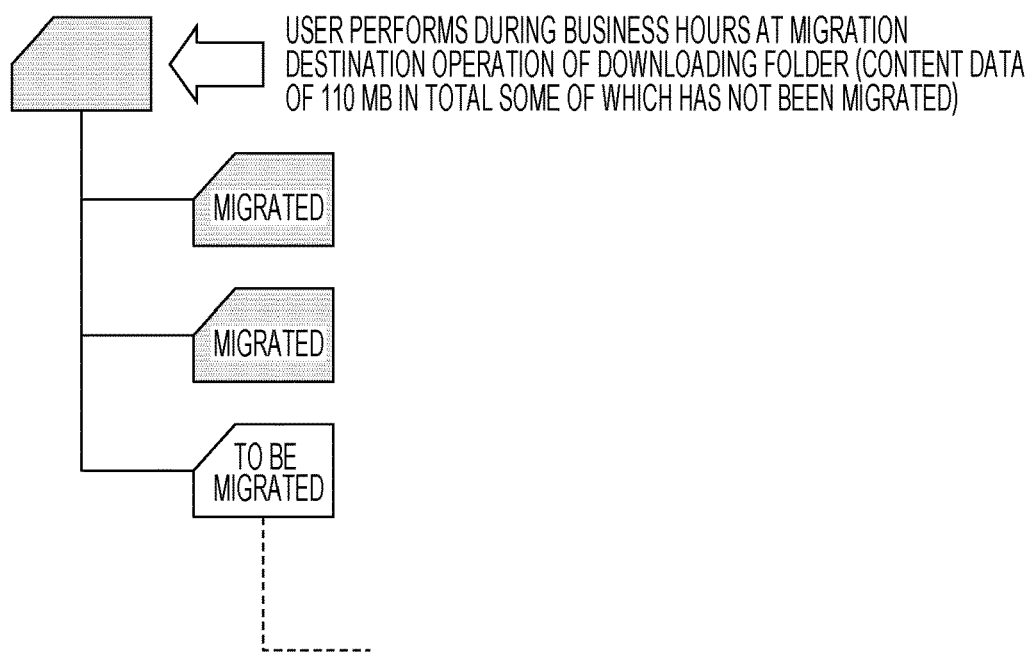
FIG. 11 is an illustration depicting an example in which a user performs during business hours in the migration-destination document management system an operation of downloading a folder that contains content data of 110 MB in total some of which has not been migrated.

Next, as a second example, which is depicted in FIG. 11, a description will be given of a case where a user performs during business hours in the migration-destination document management system 18 an operation of downloading a folder that contains content data of 110 MB in total some of which has not been migrated. It is assumed that the average speed of data migration during business hours, which is derived from the migration-process result table, is equal to 0.5 s/MB and the average speed of download operation, which is derived from the operation log of the migration-destination document management system 18, is equal to 0.1 s/MB. In addition, it is assumed that 10 MB content data has not been migrated and 100 MB content data has been migrated.

In this case where the data is migrated and then the migration-destination document management system 18 is caused to perform the download operation, the estimated time T1 is calculated as 0.5 s/MB×10 MB+0.1 s/MB×110 MB=16 s.

In contrast, if the average speed of download operation derived from the operation log of the migration-source document management system 17 is assumed to be 0.2 s/MB, the estimated time T2 for the migration-source document management system 17 to perform the download operation is calculated as 0.2 s/MB×110 MB=22 s.

If the setting in the processing-assignment-function-during-migration setting screen is such that the item "Processing Time in New System Is Equal to 120% of Processing Time in Existing System" is selected as depicted in FIG. 4, 120% of the estimated time for the migration-source document management system 17 to perform the download operation is calculated as 22 s×1.2=26.4 s. Consequently, in this example, since the estimated time T1<the estimated time T2×1.2, the migration controller 22 assigns the processing to the migration-destination document management system 18.

Next, a description will be given of a case where 100 MB content data has not been migrated and 10 MB content data has been migrated in the second example.

In this case where the data is migrated and then the migration-destination document management system 18 is caused to perform the download operation, the estimated time T3 is calculated as 0.5 s/MB×100 MB+0.1 s/MB×110 MB=61 s.

In contrast, the estimated time T2 for the migration-source document management system 17 to perform the download operation is calculated to be T2=22 s as described above.

If the setting in the processing-assignment-function-during-migration setting screen is such that the item "Processing Time in New System Is Equal to 120% of Processing Time in Existing System" is selected as depicted in FIG. 4, 120% of the estimated time for the migration-source document management system 17 to perform the download operation is calculated as 22 s×1.2=26.4 s. Consequently, in this example, since the estimated time T1>the estimated time T2×1.2, the migration controller 22 assigns the processing to the migration-source document management system 17.

In the first example and the second example described above, descriptions have been given of the cases where the user request is assigned to the migration-source document management system 17 or to the migration-destination document management system 18 with the communication speed in the time period when the operation is performed taken into account, but this is not meant to be limiting. For example, in determining whether the user request is assigned to the migration-source document management system 17 or to the migration-destination document management system 18, the migration controller 22 may take into account at least one of the following: priorities assigned to operating users who perform operations, the time period when an operation is performed, and load conditions at the migration source and at the migration destination.

As an example in which priorities assigned to operating users are taken into account, a method is available that determines the migration sequence of the content data of files in accordance with priorities assigned to operating users. For example, in response to a plurality of user requests, an estimated time, based on which the processing is assigned to the migration-destination document management system 18, is obtained as follows. First, the migration sequence of the content data of files is determined in accordance with priorities predetermined based on organizational positions of operating users or priorities that the administrator has assigned in advance. Then, the estimated time is determined so that the content data of files is migrated in the migration sequence determined in this way, and the processing may be assigned to the migration-source document management system 17 or to the migration-destination document management system 18 by using the estimated time thus determined.

In an example in which load conditions at the migration source and at the migration destination are taken into account, the processing speed is derived for varying amounts of load by using each of the operation logs of the migration-source document management system 17 and the migration-destination document management system 18, and the processing may be assigned to the migration-source document management system 17 or to the migration-destination document management system 18 by using the processing speed corresponding to the amount of the current load.

The system migration from the server 16 to the cloud server 14 is described as an example in the above exemplary embodiment, but this is not meant to be limiting. For example, the above exemplary embodiment may be applied to a system migration between two of the servers 16 on premises or to a system migration between two of the cloud servers 14.

The process performed by the cloud server 14 according to the above exemplary embodiment may be a process performed by using software, a process performed by using hardware, or a process performed by using a combination of software and hardware. The process performed by the cloud server 14 may be stored in a recording medium as a program and distributed by using the recording medium.

The present disclosure is not limited to the above embodiment, and various modifications other than the above embodiment may obviously be practiced as long as they do not depart from the spirit of the disclosure.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
    an acquiring part that acquires a file structure at a migration source and one or more identification information items each of which identifies a file at the migration source;
    a copying part that copies the file structure and the one or more identification information items to a migration destination before migration of content data of one or more files at the migration source; and
    a switching part that, in response to detection of an operation on a file corresponding to one of the one or more identification information items copied to the migration destination by the copying part, switches an access destination to the file at the migration source if a migration time to complete migration of content data of the file and finish the operation is equal to a predetermined duration or more, wherein the switching part determines whether the migration time is equal to the predetermined duration or more by using a priority assigned in advance to a user who performs the operation.

2. The information processing apparatus according to claim 1,
    wherein the predetermined duration is equal to a processing time to switch over to an operation on the file at the migration source and process the operation.

3. The information processing apparatus according to claim 1,
    wherein the predetermined duration is equal to a processing time obtained by adding an amount of time to a time to switch over to an operation on the file at the migration source and process the operation, the amount of time being equal to a predetermined percentage of the time for the switching and processing.

4. The information processing apparatus according to claim 2,
    wherein the processing time is estimated by using an operation log at the migration source.

5. The information processing apparatus according to claim 3,
    wherein the processing time is estimated by using an operation log at the migration source.

6. The information processing apparatus according to claim 1,
    wherein the migration time is derived from a processing result of migration of the content data of the one or more files and an operation log at the migration destination.

7. The information processing apparatus according to claim 2,
wherein the migration time is derived from a processing result of migration of the content data of the one or more files and an operation log at the migration destination.

8. The information processing apparatus according to claim 3,
wherein the migration time is derived from a processing result of migration of the content data of the one or more files and an operation log at the migration destination.

9. The information processing apparatus according to claim 4,
wherein the migration time is derived from a processing result of migration of the content data of the one or more files and an operation log at the migration destination.

10. The information processing apparatus according to claim 5,
wherein the migration time is derived from a processing result of migration of the content data of the one or more files and an operation log at the migration destination.

11. The information processing apparatus according to claim 6,
wherein the processing result is obtained for each time period.

12. The information processing apparatus according to claim 1,
wherein the switching part determines whether the migration time is equal to the predetermined duration or more by using at least one of an operation log in a time period when the operation is performed and load conditions, the load conditions being a load condition at the migration source and a load condition at the migration destination.

13. The information processing apparatus according to claim 1, further comprising:
a migration part that, after migration of the identification information items each of which identifies a file at the migration source, migrates the content data of the one or more files to the migration destination in a predetermined sequence; and
a change part that changes the predetermined sequence so that the file on which the operation is detected is prioritized in migration if the switching part does not switch the access destination to the file at the migration source.

14. The information processing apparatus according to claim 2, further comprising:
a migration part that, after migration of the identification information items each of which identifies a file at the migration source, migrates the content data of the one or more files to the migration destination in a predetermined sequence; and
a change part that changes the predetermined sequence so that the file on which the operation is detected is prioritized in migration if the switching part does not switch the access destination to the file at the migration source.

15. The information processing apparatus according to claim 1, further comprising:
a migration-destination manager that serves as the migration destination and that manages a plurality of files.

16. An information processing system comprising:
the information processing apparatus including
an acquiring part that acquires a file structure at a migration source and one or more identification information items each of which identifies a file at the migration source,
a copying part that copies the file structure and the one or more identification information items to a migration destination before migration of content data of one or more files at the migration source, and
a switching part that, in response to detection of an operation on a file corresponding to one of the one or more identification information items copied to the migration destination by the copying part, switches an access destination to the file at the migration source if a migration time to complete migration of content data of the file and finish the operation is equal to a predetermined duration or more, wherein the switching part determines whether the migration time is equal to the predetermined duration or more by using a priority assigned in advance to a user who performs the operation; and
a migration-source manager that serves as the migration source and that manages a plurality of files to be migrated in a predetermined file structure together with identification information items each of which identifies one of the plurality of files to be migrated.

17. A non-transitory computer readable medium storing a program causing a computer to execute a process for information processing, the process comprising:
acquiring a file structure at a migration source and one or more identification information items each of which identifies a file at the migration source;
copying the file structure and the one or more identification information items to a migration destination before migration of content data of one or more files at the migration source; and
in response to detection of an operation on a file corresponding to one of the one or more identification information items copied to the migration destination by the copying part, switching an access destination to the file at the migration source if a migration time to complete migration of content data of the file and finish the operation is equal to a predetermined duration or more; and
determining whether the migration time is equal to the predetermined duration or more by using a priority assigned in advance to a user who performs the operation.

* * * * *